March 30, 1965 M. LIGER 3,176,237

TELECOMMUNICATION RECEIVERS

Filed Nov. 25, 1960 4 Sheets-Sheet 1

Inventor
Marc Liger
By
Wenderoth, Lind + Ponack
Attorneys

Inventor
Marc Liger
By
Wenderoth, Lind & Ponack
Attorneys

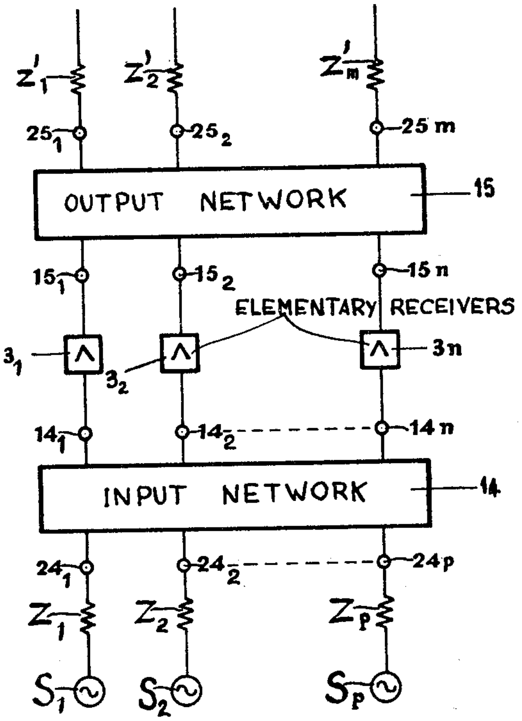
- Fig.4 -
Inventor
Marc Liger
By
Wenderoth, Lind & Ponack
Attorneys

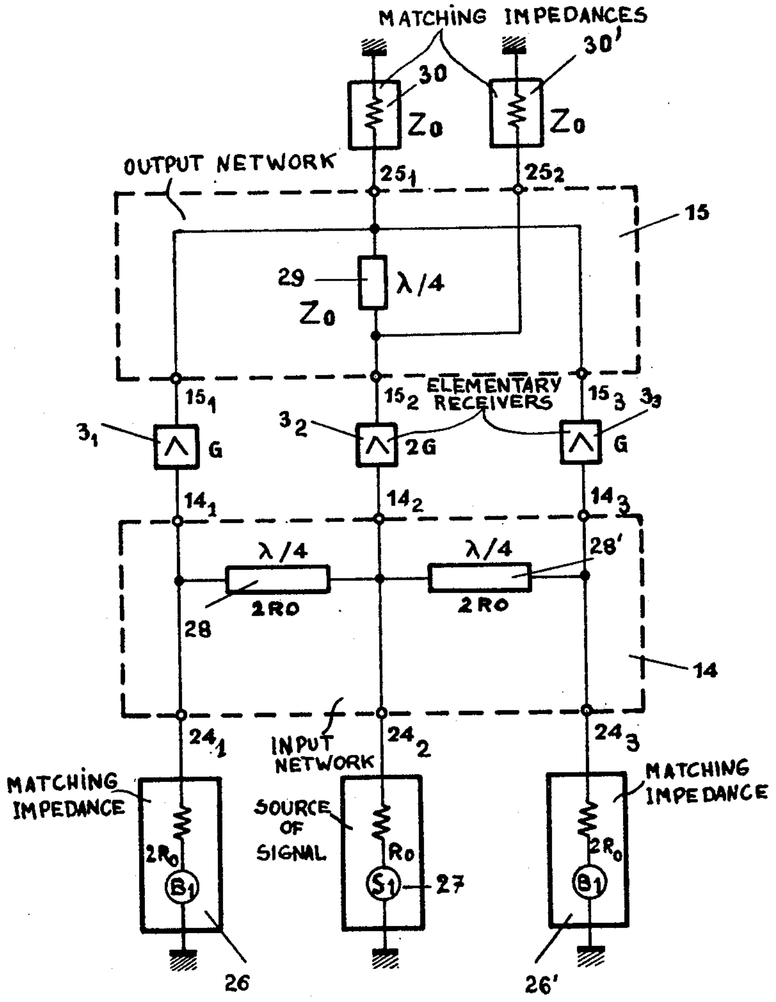
- Fig. 5 -
Inventor
Marc Liger
By
Wenderoth, Lind & Ponack
Attorneys

United States Patent Office 3,176,237

Patented Mar. 30, 1965

3,176,237
TELECOMMUNICATION RECEIVERS

Marc Liger, Draveil, France, assignor to Societe Anonyme de Telecommunications, Paris, France, a French body corporate Filed Nov. 25, 1960, Ser. No. 71,669
Claims priority, application France, Mar. 2, 1960, 820,089
3 Claims. (Cl. 330—53)

The present invention concerns a telecommunication receiver matched to the sources of signals which feed it and occupying any position, intermediate or terminal, in the telecommunication link in which it is employed. The constitution of the receiver of the invention depends on its position in the telecommunication link in which it is employed, as well as on the band width and mean frequency of the frequency band transmitted by the link; thus the receiver of the invention is functionally comparable to a simple amplifier, to a unidirectional transmission element.

It is known to be preferable to match the receiver in a telecommunication link with the signal sources which feed it so that the energy supplied by those sources may be wholly transmitted to the receiver, thus avoiding reflection of a fraction of this energy at the input of the receiver, and interference of the fraction with the incident energy giving rise to amplitude and phase distortion of the received signals which could much reduce the quality of the link. It is also known that the matching of a receiver with the signal sources which feed it does not permit of the noise factor of the receiver being reduced to a minimum, such reduction, or the contrary, being possible only by mismatching the receiver and the signal sources.

The receiver of the present invention is of the type above indicated, and combines the advantage of being matched with the signal sources which feed it with that of having a low noise factor; the receiver according to the invention is characterised by the fact that, with the aim of reducing its noise factor it is made up of several component receivers, preferably mismatched, connected between an output network and an input network to which the signal sources and the matching impedances are joined, these input and output networks being so designed that at the output of the receiver the signals coming from the said sources and transmitted by the several component receivers, have such amplitude and phase relations that the resultant signal is of maximum amplitude, while the noises coming from the matching impedances and transmitted by the component receivers have, on the contrary, such phase and amplitude relations that the resultant noise is of minimum and preferably zero amplitude.

The several component receivers which make up the receiver of the present invention are constructed according to the band width and middle frequency of the frequency band transmitted by the telecommunication link under consideration; as the case may require they may individually consist of amplifiers, unidirectional conductive elements.

By way of example there are described below and shown diagrammatically in the accompanying drawing several constructions of telecommunication receiver according to the invention.

FIG. 4 is a block diagram of the most general type of telecommunication link which can be equipped with a receiver according to the present invention.

FIG. 5 is a diagram of a particular construction of the telecommunication link of FIG. 4.

Figure 1:
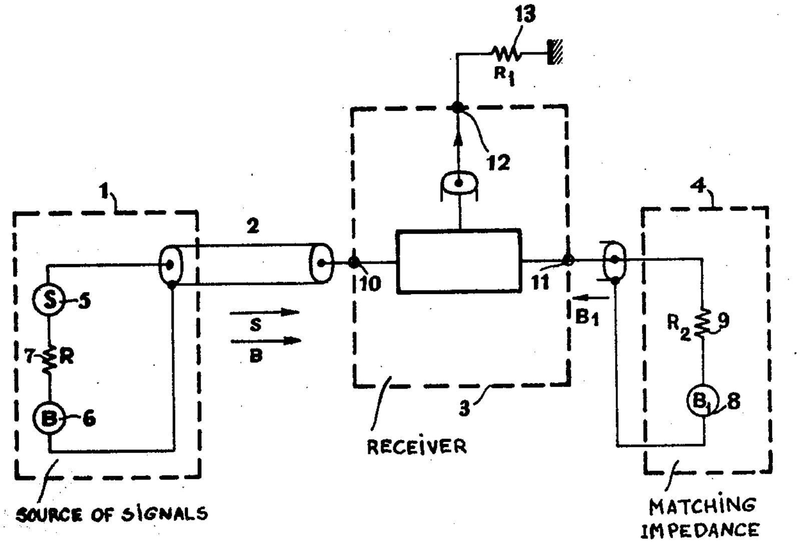
FIG. 1 is a block diagram of a telecommunication link equipped with a receiver according to the invention.

The noise at the receiver output results from the noise transmitted by the signal sources, from noise in the receiver itself, and from noise from the matching impedances. In the simple case of a source supplying a signal voltage E, and presenting a noise E.M.F. $e$ connected with its internal resistance R, the source feeding a receiver of internal matched resistance R presenting a noise E.M.F. $e'$, it is easy to calculate the signal to noise ratio, which for the source is $E/e$, and for the receiver assumes a value substantially equal to $E/e\sqrt{2}$, that is to say it suffers a reduction of 3 db due to the matching of the receiver to the source; to this reduction of the signal to noise ratio there corresponds a degradation of the noise factor of the receiver of the same amount 3 db, due mainly to the matching.

The telecommunication receiver of the present invention offers the double advantage of being matched with the signal sources which feed it and of having a noise factor of the least value it is possible to give to known receivers of the same type by refraining from matching them with their signal sources; this result is obtained according to the present invention by preventing the noise power of the matching impedances from being transmitted to the receiver output, where it would add to the noise powers coming from the signal sources and from the receiver itself. The diagram of a telecommunication link shown in FIG. 1 suffices to explain the principle of the invention. In this FIGURE 1 is a source of signals, 3 a receiver according to the present invention connected to the signal source by the line 2, and 4 is a matching impedance; the signal source may be represented diagrammatically by a signal E.M.F. 5 of value S in series with a noise E.M.F. 6 of value B and with a resistance 7 of value R which is the internal resistance; the receiver 3 has been assumed to be a simple six-terminal network, and the terminals being grouped in pairs is shown as a three terminal network, terminal 10 being connected to the line 2, terminal 11 to the matching impedance 4, and terminal 12 to the receiver output terminals to which is connected a resistance R1 which is the load of the receiver and to which it may be matched; the load impedance 4 is shown diagrammatically by a noise E.M.F. 8 of magnitude B1 in series with a resistance 9 of value R2.

It can be taken that the voltage appearing at the output terminal 12 of receiver 3 results from the combined action on the receiver on the one hand of the signal S and of the noise B coming from the signal source 1 and entering by the terminal 10, and on the other hand of the noise B1 coming from the matching impedance R2 and entering by the terminal 11.

As indicated above the general principle of the invention is to reduce to a minimum, and if possible to suppress, the effect of the noise B1 from the matching impedance 4 at the output 12 of the receiver 3, without lowering the signal level at the output, so that the receiver is matched by the impedance 4 without the matching resulting in a higher noise factor; the advantage obtained is what could be expected from matching by an impedance producing no noise, an effect not obtainable prior to this invention.

Figure 2:
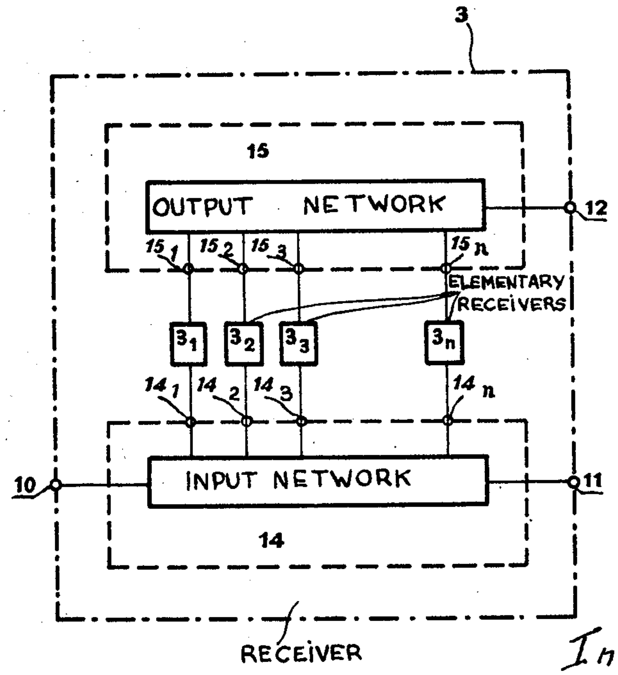
FIG. 2 shows the theoretical diagram of the receiver with which the telecommunication link of FIG. 1 is equipped.

In the case of a receiver such as 3 in FIGS. 1 and 2, comparable to a six-terminal network, the above-stated general principle of the invention may be translated into "conditions governing direction of transmission between the several terminals of the receiver"; there are two such conditions, 1st—The noise B1 entering the receiver 3 by its terminal 11 should be transmitted only to the receiver terminal 10, and 2nd—The signal S and noise B which enter the receiver by its terminal 10, superimposed the one on the other, should be transmitted at least in part to the receiver output terminal 12, preferably in such fashion that the signal S has maximum amplitude.

The consequence of these two conditions is that, seen from the receiver terminal 12 the impedance 4 appears to produce no noise. As indicated above there results an improvement in the signal to noise ratio at the output of the receiver, and therefore of the noise factor of the receiver, by the factor $\sqrt{2}$, say 3 db; conversely, the same signal to noise ratio can be obtained with the power of the source of signals reduced by a half.

In its most general form, shown in block diagram in FIG. 2; the receiver 3 of the invention is made up of an input network 14, an output network 15 and an arbitrary, integral number $n$ of elementary receivers $3p$; the input network has $n+2$ (pairs of) terminals, two of them connected respectively to the receiver terminals 10 and 11, and the rest numbered 14.1 to 14.*n*; the output network 15 has $n+1$ (pairs of) terminals, one connected to the receiver output 12 and the rest numbered 15.1 to 15.*n*; each of the $n$ elementary receivers 3*p* has its input and output connected respectively to the terminals 14*p*, 15*p* of the input and output networks; the elementary receivers 3*p* may be of any desired construction suited to the band width and mid frequency of the frequency band transmitted by the link in which the receiver 3 is incorporated; in particular these elementary receivers can be amplifiers, rectifiers, diodes, or in general unidirectional transmission integers, so connected as to allow transmission to the output network 15 of information received from the input network 14, and to oppose transmission of information in the opposite sense.

Mathematical analysis of the conditions governing direction of transmission above stated in the case of the receiver 3 in FIG. 2 is as follows.

If S1 be the sum of the signal S and noise B transmitted by the source of signals to the input terminal 10 of the receiver 3, it may readily be shown that the value of the elementary signal which appears at the receiver output terminal 12 after transmission by the elementary receiver 3*p* from the input network 14 to the output network 15 is $$S'_p=S_1e^{(-a_p+a'_p-a''_p)-j(\alpha_p+\alpha'_p+\alpha''_p)} \tag{1}$$

where $a_p$ and $\alpha_p$ are respectively the attenuation in nepers and the shift of phase suffered by the input signal S1 between the terminal 10 of the receiver 3 and the terminal $\mathbf{14}_p$ of its input network; $a'$ and $\alpha'_p$ are respectively the gain in nepers and the shift of phase suffered by the signal between the input and output of the elementary receiver $\mathbf{3'}_p$; and $a''_p$ and $\alpha''_p$ are respectively the attenuation in nepers and the shift of phase of the elementary signal between the terminal $\mathbf{15}_p$ of the output network 15 of receiver 3 and the output terminal 12 of the receiver.

The resultant signal appearing at the output terminals 12 is obviously the algebraic sum of the several elementary signals $S'_p$ which have been transmitted by the several elementary receivers $\mathbf{3}_p$; so its value is $$S'=\sum_{p=1}^{p=n}S'_p=S_1\sum_{p=1}^{p=n}e^{(-a_p+a'_p-a''_p)-j(\alpha_p+\alpha'_p+\alpha''_p)} \tag{2}$$

Similarly, to the noise B1 transmitted by the matching impedance 4 to the input terminal 11 of the receiver 3 there correspond, at the reeciver output terminal, as many elementary noises $B'_p$ as there are elementary receivers $\mathbf{3}_p$, each of value $$B'_p=B_1e^{(-b_p+a'_p-a''_p)-j(\beta_p+\alpha'_p+\alpha''_p)} \tag{3}$$

The resultant noise at the output terminal 12 of the receiver 3 due to the matching impedance 4 is $$B'=B_1\sum_{p=1}^{p=n}e^{(-b_p+a'_p-a''_p)-j(\beta_p+\alpha'+\alpha''_p)} \tag{4}$$

The notation adopted in the Formulae 3 and 4 is the same as that adopted in the Formulae 1 and 2, $b_p$ and $\beta_p$ being respectively the attenuation in nepers and the shift of phase suffered by the noise B1 between the input terminal 11 of the receiver 3 and the output terminal $\mathbf{14}_p$ of the input network 14.

Using an obvious notation the Formulae 2 and 4 can be put in the form $$S'=S_1\sum_{p=1}^{p=n}(Y_p+jY_p) \tag{2'}$$

$$B'=B_1\sum_{p=1}^{p=n}(X_p+jY_p)e^{(a_p-b_p)+j(\alpha_p-\beta_p)} \tag{4'}$$

The conditions governing direction of transmission set out above are equivalent to $$S'\neq 0 \tag{5}$$

$$B'=0 \tag{6}$$

Compatibility of these two equations is the necessary and sufficient condition to make possible design of the input and output networks 14 and 15 of the receiver according to the invention, the basic diagram of which is shown in FIG. 2, so that the conditions governing direction above mentioned may be satisfied and the advantages above indicated may thus be obtained. In general this compatibility is shown by the following: it is always possible to give arbitrary values to the factors $X_p$, $Y_p$ such that the real and imaginary parts of the second term of Equation 2′ shall not be simultaneously zero. If these arbitrary values of the factors $X_p$, $Y_p$ are then substituted in the second term of Equation 4′, Equation 6 becomes a complex equation the real unknowns of which are the ters $a_p$, $b_p$, $\alpha_p$, $\beta_p$, which depend solely upon the input network 14 of the receiver 3; it is generally possible so to choose the characteristics of this input network that the resulting values of the terms $a_p$, $\alpha_p$, $\beta_p$, $b_p$, may be real roots of the complex Equation 6; the elementary receivers $\mathbf{3}_p$ and the output network 15 of receiver 3 can then be determined so that the terms $a'_p$, $\alpha'_p$, $a''_p$, $\alpha''_p$ may have such values that, taking into account the values determined for the terms $a_p$, $b_p$, $\alpha_p$, $\beta_p$, the relation (5) may be effectively satisfied.

A particular example illustrating the compatibility of the relations (5) and (6) is as follows; if receiver 3 is so designed that each elementary signal $S'_p$ suffers between the input terminal 10 and the output terminal 12 of the receiver a total damping and a total shift of phase $a_0$ nepers and $\alpha_0$, irrespecive of the order $p$ of the elementary receiver which transmitted the signal considered, then Equations 2 and 4′ may be put in the following terms $$S'=S_1\sum_{p=1}^{p=n}e^{-(a_0+j\alpha_0)}=nS_1e^{-(a_0=j\alpha_0)} \tag{2''}$$

$$B'=B_1e^{-(a_0+j\alpha_0)}\sum_{p=1}^{p=n}e^{(a_p-b_p)+j(\alpha_p-\beta_p)} \tag{4''}$$

Substituting for the first exponential term the value given by (2″)

$$B'=S'\frac{B_1}{nS_1}\sum_{p=1}^{p=n}e^{(a_p-b_p)+j(\alpha_p-\beta_p)} \tag{7}$$

Equation 6 is replaced by $$\sum_{p=1}^{p=n}e^{(a_p-b_p)+j(\alpha_p-\beta_p)}=0 \tag{6'}$$

the solution of which for $a_p$, $b_p$, $\alpha_p$ and $\beta_p$ enables the determination of the input network 14 of receiver 3. The simultaneous equations $$-a_p+a'_p-a''_p=a_0 \tag{7'}$$

$$\alpha_p+\alpha'_p+\alpha''_p-\alpha_0 \tag{7''}$$

can readily be satisfied, for example by adjusting the gains $a'_p$ and the phase shifts $\alpha'_p$ of the elementary receivers $3_p$ as a function of the attenuations and phase shifts produced by the input and output networks 14 and 15 respectively of receiver 3 between their input or output terminals 10 or 12, and their terminals connected to elementary receiver $3_p$.

In the yet more special case of the input network 14 of receiver 3 being an artificial transmission line the ends of which are connected respectively to the terminals 10 and 11 of receiver 3 while its $n$ tappings $14_p$ are arranged to present infinite output impedance to which the relatively small input impedances of the elementary receivers $3_p$ connected to them are mis-matched, the supplementary relations (8) $$a_p+b_p=a'_0$$

(8') $$\alpha_p+\beta_p=\alpha'_0$$

make it possible to put Equation 6' in the form (6'') $$e^{-(a'_0=j\alpha'_0)}\sum_{p=1}^{p=n} e^{2(a_p+j\alpha_p)}=0$$

and further, if the input network 14 is purely reactive and so $a_p=0$ for any $p$ (6''') $$\sum_{p=1}^{p=n} e^{2j\alpha_p}=0$$

an equation that determines the position of the $n$ tappings $14_p$ on the artificial line 14.

In the yet more special case in which all the segments of the artificial line 14 are identical with one another and so cause the same shift of phase $\alpha$, the equation (9) $$\alpha_p=p\alpha$$

makes it possible to put Equation 6''' in the form ($6^{IV}$) $$\sum_{p=1}^{p=n} e^{2jp\alpha}=\frac{e^{2jn\alpha}-1}{1-e^{-2j\alpha}}=0$$

the solutions of which are

(10) $$\alpha=k\frac{\pi}{n}$$

$k$ being integral and not a multiple of $n$. For example in the case of $n=2$ elementary receivers.

(10') $$\alpha=(2k'+1)\frac{\pi}{2}$$

$k'$ being any integer, from which it follows that the signals issuing from the terminals $14_1$, $14_2$ of the input network 14 should be in quadrature.

Figure 3:
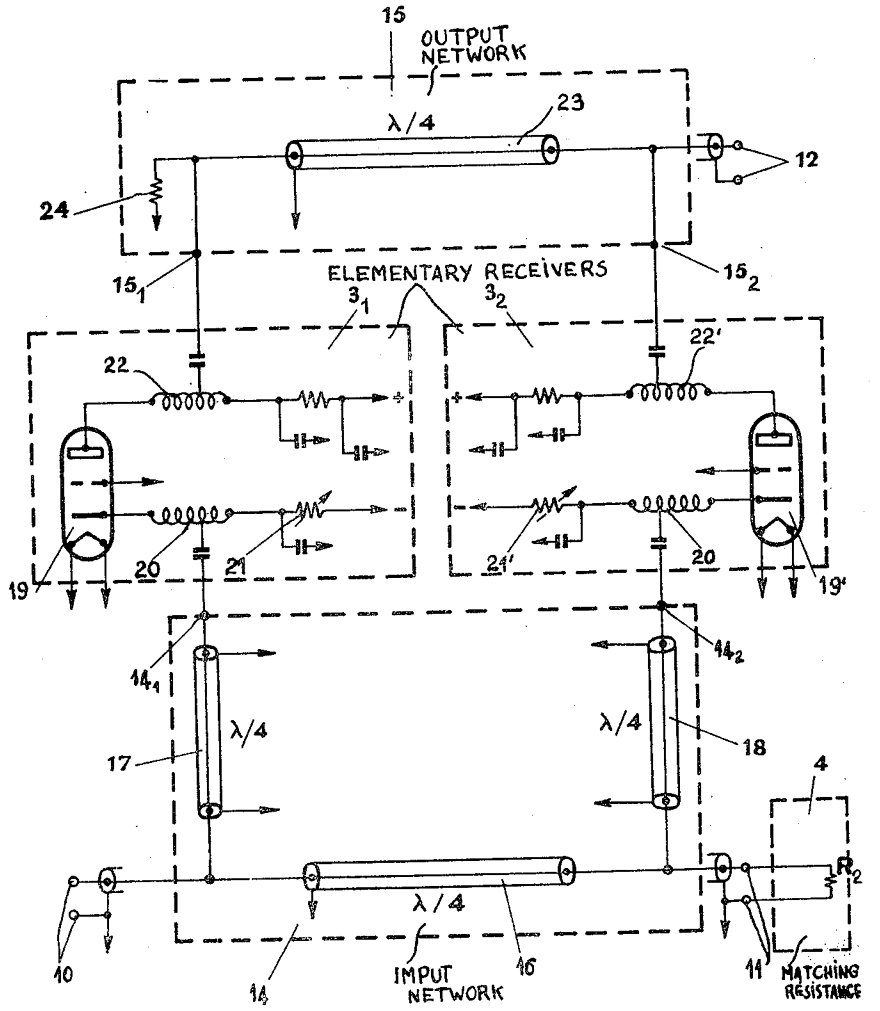
FIG. 3 shows a diagram of a particular construction of the receiver of FIG. 2.

The design of receiver according to the present invention shown in FIG. 3 of the accompanying drawing corresponds to this last example. This receiver has been so designed that it can be inserted in a telecommunication link transmitting a frequency band the mid frequency of which is near 130 mc./s.; the input network 14 is formed by an artificial delay line made up of three quarter wave elements: 16, of 50 ohms impedance connected between the signal input terminal 10 and the terminal 11 to which the matching resistance $R_2$ of 50 ohms is connected; 17 and 18, each of 75 ohms impedance, connected respectively between the terminals 10 and 11 on the one hand and terminals $14_1$ and $14_2$ on the other hand, to which latter terminals the inputs of the receivers $3_1$ and $3_2$ are respectively connected. These two receivers are nearly alike in constitution and are formed by amplifiers designed to give maximum gain in the neighbourhood of 130 mc./s.; each amplifier consists essentially of an earthed grid valve; the signal appearing at the terminals $14_1$, $14_2$ respectively of the input network 14 is fed to the cathode of the corresponding valve 19, 19' through a high ratio auto-transformer 20, 20' to one terminal of which is connected through a gain control potentiometer 21, 21' the source of bias of the valves 19, 19'; signals amplified by the valves 19, 19' are collected from their anodes through transformers 22, 22' of even higher ratio than the input transformers 20, 20' (for example a ratio of 3 for transformers 20, 20' and of 12 for transformers 22, 22'). The output network 15 consists of a single quarter wave line 23 of 50 ohms impedance the ends of which are connected on the one hand to the terminals $15_1$, $15_2$ which are joined to the outputs of the amplifiers $3_1$, $3_2$, and on the other hand to the output 12 of the receiver. Since the valves 19, 19' have their grids earthed their cathode input circuits will be of low impedance, and seen from the inputs $14_1$ and and $14_2$ of the amplifiers $3_1$, $3_2$, will seem to be of still lower impedance because of the high ratio transformers 20, 20'; hence the impedances at the junctions between the quarter wave elements 17, 18 and the artificial line 16 have very high values; as, moreover, these junctions are a quarter wave length apart along the artificial line 16 the disturbances they impart to it practically compensate each other, and the artificial line seen from its input 10 appears to be exactly matched to the resistance $R_2$, the value of which is equal to the characteristic impedance of the line, say 50 ohms; the input impedance of the receiver of FIG. 3 is then equal to its matching resistance 4. On the other hand, the low values of impedance at the ends of the quarter wave elements 17, 18 connected respectively to the inputs of the amplifiers $3_1$, $3_2$, are transformed into high impedances by the high ratio transformers 20, 20', and so are mis-matched to the low input impedances of the valves 19, 19', the grids of which are earthed; this mis-matching to the input impedance is known to be favourable to reduction of the noise factor of each elementary amplifier $3_1$, $3_2$. It is easy to see that any signal S' applied to the receiver input 10 causes two elementary signals $S'_1$ and $S'_2$ to appear at the output 12, these having traversed respectively the elementary amplifiers $3_1$ and $3_2$, and being, if the amplifier gains are suitably adjusted, substantially in phase and of the same amplitude. The noise $B_1$ transmitted by the matching impedance 4 to the the input 11 of the receiver, on the contrary, produces at the output 12 two components $B'_1$ and $B'_2$ which differ in phase by twice $$\frac{\pi}{2}$$

that is to say are opposite in phase; as, moreover, their amplitudes are nearly alike they compensate one another, and the compensation may be made perfect by suitable adjustment of the gains of the elementary amplifiers $3_1$, $3_2$; so at the output 12 there appears no noise component due to the matching impedance 4.

The receiver above described with reference to FIG. 3 has been constructed, and has been found to have a resultant gain of 11 db, and its input impedance, 50 ohms, showed a standing wave ratio of less than 1.2; used as a preamplifier to a standard receiver having a noise factor of 5.5 db, the receiver matched according to the present invention makes possible a composite receiver with a resultant noise factor of about 1.5 db.

The most general form of receiver according to the invention is shown in FIG. 4 and is made up of the following parts: an input network having $n+p$ terminals, terminals $24_1$ to $24_p$ being connected respectively to sources of signals or of noise or of both $S_1$ to $S_p$ through impedances $Z_1$ to $Z_p$ assumed to be free of noises; impedances $Zj$ ($j$ being any integer between 1 and $p$ included) associated with signal sources $S_j'$ and representing the internal impedances of those sources; impedances $Z_j'$ associated with noise sources $S_j$ and representing matching impedances each producing noise corresponding to the associated source; terminals $14_1$ to $14_n$ of the input network connected respectively to the inputs of component receivers $3_n$, which must satisfy the one condition of transmitting information unidirectionally from their inputs to their outputs; and an output network 15 having terminals $15_1$ to $15_n$ connected to the outputs of the $n$ component receivers, and having also $m$ outputs $25_1$ to $25_m$ to which are respectively connected impedances $Z'_k$ some of which may represent receiving apparatus in the telecommunication network under consideration, and others matching impedances of the output network 15. The principal characteristic of this receiver is that the input and output networks are so designed that at all outputs $25_k$ of the receiver which are connected to receiving impedances $Z'_k$ signals coming from sources $S_j$ and transmitted by different component receivers $3_p$ are so related in phase and amplitude that the resultant signal is of maximum amplitude, while the noises coming from matching impedance $Z_j$ and also transmitted by the component receivers $3_p$ are, on the contrary, so related in phase and amplitude at outputs of the receiver that the resultant noise is of minimum and preferably zero amplitude. This characteristic can be expressed mathematically, setting out from the expression for the resultant signal $S'_k$ which appears at the terminals of the receiving impedance $Z'_k$, namely, $$S'_k=\sum_{j=1}^{j=p} h_k^j E_j \quad (11)$$

where $E_j$ is the electromotive force of the source $S_j$ of signal or noise, $h_k^j$ is a coefficient depending on the input network 12, the output network 15, the component receivers $3_p$ and the frequency of the signals transmitted.

In this equation control of direction in the receiver from its inputs $24_1$, $24_m$, $24_n$ (1, $m$, $n$ being different integers between 1 and $p$ included), for example, to its output terminals $25_k$ is represented by the fact that all the parameters $h_k^j$ are zero except $h_k^1$, $h_k^m$, $h_k^n$ in the example considered. If these conditions governing direction are satisfied the signals emitted by the sources $S_j$, $S_1$, $S_p$ are transmitted to the output $25_k$ of the receiver at an amplitude that is not zero, while, on the contrary, none of the noise produced by the matching impedances $Z_j$ connected to the receiver terminals other than $24_1$, $24_m$, $24_n$ is transmitted to the output terminal $25_k$.

The particular case shown in FIG. 5 comprises a single signal source 27 of electromotive force $S_1$ and of internal resistance $R_0$, and two identical matching impedances 26, 26', each of which may be represented by a source of noise of electromotive force $B_1$ in series with a resistance of twice the magnitude of the internal resistance of the signal source 27, say $R_0$. The input network 14 is made up of two quarter wave line elements 28, 28' of the same characteristic impedance $R_0$; the junction of 28 and 28' is connected to the input terminal $24_2$ of the input network 14 to which the signal source 27 is connected, as well as to the output terminal $14_2$ of the input network 14; the remaining ends of 28 and 28' are respectively connected to the input terminals $24_1$, $24_3$ of the input network to which the matching impedances 26, 26' are joined, as well as to the output terminals $14_1$, $14_3$ of network 14; the three component amplifiers $3_1$ to $3_3$, the inputs of which are connected respectively to the outputs $14_1$ to $14_3$ of the input network, have gains G, 2G and G respectively; their outputs are connected to the inputs $15_1$ to $15_3$ of the output network 15 which consists of a single quarter wave line element 28 of characteristic impedance $Z_0$, one end of which is joined to the input terminal $15_2$ of the output network 15 and also to its output terminal $25_2$ while its other end is connected both to the two input terminals $15_1$ and $15_3$ and to the output terminal $25_1$; two matching impedances 30 and 30' are connected to the output terminals $25_1$ and $25_2$ of the output network $15_1$ of a value equal to the characteristic impedance $Z_0$ of the quarter wave element 29.

This special case can be deduced from the general case of FIG. 4 by making $n$ and $p$ the same number, namely 3, and making $m$ equal to 2. It may readily be seen that the receiver of the invention made up of 14, 15, and $3_1$ to $3_3$ in FIG. 5 is exactly matched to the signal source 27 by the two impedances 26, 26', and that the noises emitted by each matching impedance and transmitted by the several component receivers $3_1$ to $3_3$ have, at the output $25_1$, such amplitudes and phases that they wholly compensate each other; on the other hand, at the output $25_2$ these resultant noises from the matching impedances are of such amplitudes and phases that they add and do not cancel out; so all the noise produced by the matching impedances 26, 26' is transmitted by the receiver of FIG. 5 to the impedance 30' alone, the impedance 30 receiving none of it; also, the component signals resulting from the transmission of the signal $S_1$ produced by source 27 through the three component receivers $3_1$ to $3_3$ are in phase at the output terminal $25_1$, where their amplitudes add together, while at terminal $25_2$ they are in opposing phases and of such amplitudes that they cancel out; so the signal emitted by the source 27 is transmitted only to impedance 30, not to impedance 30'.

It is possible to connect in cascade a plurality of receivers matched according to the present invention, having the same numbers of input terminals and output terminals respectively, the input terminals of one receiver being connected to the output terminals of the preceding receiver; such an arrangement can greatly improve the noise factor of the whole telecommunication link in which it is employed.

I claim:

1. A telecommunication receiver, comprising an input phase-shifting network having input terminals connected to at least one source of signals and to at least one matching impedance for said source of signals, and a plurality of output terminals, an output phase-shifting network having a plurality of input terminals and at least one output load terminal, and a plurality of unidirectional transmission devices $n$ in number, having respective inputs and outputs, between which the transmission factors and phase shifts are respectively $a'_1, a'_2 \ldots a'_n$ and $\alpha'_1, \alpha'_2 \ldots \alpha'_n$, impedance transforming means for connecting therethrough the inputs of said transmission devices respectively to output terminals of said input network at which the successive transmission attenuations and phase shifts measured from the input terminal thereof connected to said source of signals, are respectively $a_1, a_2 \ldots a_n$ and $\alpha_1, \alpha_2 \ldots \alpha_n$, said attenuations and phase shifts having substantially the relationship $$e^{2(a_1+j\alpha_1)}+e^{2(a_2+j\alpha_2)}+\ldots+e^{2(a_n+j\alpha_n)}=0$$

where $j=\sqrt{-1}$, said transforming means being adapted for impedance-mismatching the inputs of said transmission devices with the said output terminals of the input network to which the said last inputs are connected therethrough, and the outputs of said transmission devices being connected to input terminals of said output network from which successively the transmission attenuations and phase shifts measured at the said output load terminal thereof are equal to the differences between an arbitrary constant and respectively $\alpha_1-\alpha'_1, \alpha_2-\alpha'_2 \ldots \alpha_n-\alpha'_n$ and $\alpha_1+\alpha'_1, \alpha_2+\alpha'_2 \ldots \alpha'_n+\alpha'_n$.

2. A telecommunication receiver comprising an input delay line connected at one end to a source of signals and at the other end to a matching impedance for said source of signals, an output delay line connected at one end to a load and at the other end to a terminating impedance, each of said delay lines consisting in $(n-1)$ tandem-connected, attenuation-free sections each having a same phase shift equal to 180° $xk/n$ where $k$ is any integer not being a multiple of $n$, a plurality of amplifiers $n$ in number, all having substantially a same phase shift from input to output thereof, impedance transforming means for connecting therethrough the inputs of said amplifiers respectively to the section junction points on said input line, said transforming means being adapted for impedance-mismatching the inputs of said amplifiers with the said junction points on the input line, and the output of each of said amplifiers being connected to the section junction point on said output line at which the phase shift measured from the said other end of the output line is substantially equal to the phase shift measured between the said one end of the input line and the junction point thereon to which the input of the same amplifier is connected through said transforming means.

3. A telecommunication receiver for receiving a band of frequencies, comprising an input delay line connected at one end to a source of signals and at the other end to a matching impedance for said source of signals, an output delay line connected at one end to a load and at the other end to a terminating impedance, each of said delay lines consisting in one quarter wave section for the mid-frequency of the band to be received, first and second substantially identical amplifiers, having very low input impedances, the outputs of said first and second amplifiers being connected respectively to the said other end and the said one end of the output line, a first and second other quarter wave line sections connected at one end respectively to the said one end and the said other end of the input line, and first and second high ratio transformers inserted respectively between the other ends of said first and second other line sections and the inputs of said first and second amplifiers.

References Cited by the Examiner

UNITED STATES PATENTS

| | | | |
|---|---|---|---|
| 1,949,217 | 2/34 | Nakken | 330—124 X |
| 2,043,587 | 6/36 | Macalpine | 330—124 X |
| 2,263,376 | 11/41 | Blumlein et al. | 330—54 |
| 2,545,871 | 3/51 | Bell | 333—29 X |
| 2,552,160 | 5/51 | Espley | 250—54 X |
| 2,790,956 | 4/57 | Ketchledge | 333—29 X |
| 2,921,134 | 1/60 | Greenspan et al. | 333—29 X |
| 2,922,965 | 1/60 | Harrison | 333—29 X |

ROY LAKE, *Primary Examiner.*

L. MILLER ANDRUS, NATHAN KAUFMAN, *Examiners.*